(12) United States Patent
Benthien et al.

(10) Patent No.: US 8,424,803 B2
(45) Date of Patent: Apr. 23, 2013

(54) ATTACHMENT ARRANGEMENT FOR A CARGO COMPARTMENT FLOOR OF AN AIRCRAFT AND AIRCRAFT WITH AN ATTACHMENT ARRANGEMENT OF THIS TYPE

(75) Inventors: Hermann Benthien, Sottrum (DE); Andreas Poppe, Reeβum (DE)

(73) Assignee: Airbus Operations GmbH, Hamburg (DE)

( * ) Notice: Subject to any disclaimer, the term of this patent is extended or adjusted under 35 U.S.C. 154(b) by 316 days.

(21) Appl. No.: 12/777,745

(22) Filed: May 11, 2010

(65) Prior Publication Data

US 2010/0294884 A1 Nov. 25, 2010

Related U.S. Application Data

(60) Provisional application No. 61/179,876, filed on May 20, 2009.

(51) Int. Cl.
*B64C 1/18* (2006.01)
*B64C 1/20* (2006.01)

(52) U.S. Cl.
USPC .................................... 244/118.1; 244/118.2

(58) Field of Classification Search ............... 244/118.1, 244/119, 137.1, 120, 117 R, 118.2, 131
See application file for complete search history.

(56) References Cited

U.S. PATENT DOCUMENTS

| | | | | |
|---|---|---|---|---|
| 4,077,590 | A * | 3/1978 | Shorey | 410/77 |
| 6,557,800 | B2 * | 5/2003 | Medina et al. | 244/118.1 |
| 7,472,867 | B2 * | 1/2009 | Huber et al. | 244/118.1 |
| 2003/0057326 | A1 * | 3/2003 | Medina et al. | 244/137.1 |
| 2005/0224645 | A1 * | 10/2005 | Huber | 244/118.1 |
| 2007/0007392 | A1 * | 1/2007 | Huber et al. | 244/137.1 |
| 2010/0294884 | A1 | 11/2010 | Benthien et al. | |

FOREIGN PATENT DOCUMENTS

| EP | 1 481 894 A2 | 1/2004 |
|---|---|---|
| WO | WO 2005/012083 A1 | 2/2005 |

* cited by examiner

*Primary Examiner* — Philip J Bonzell
(74) *Attorney, Agent, or Firm* — Jenkins, Wilson, Taylor & Hunt, P.A.

(57) ABSTRACT

The present invention provides an aircraft floor of an aircraft consisting of a number of base plates and a number of longitudinal supports and provides an aircraft with a floor of this type. The aircraft floor has transverse joints for partitioning the floor into a plurality of segments transversely to a longitudinal axis of the aircraft, the respective segment consisting of a number of longitudinal support elements, partitioned by the transverse joints, of the longitudinal supports and of a number of base plate elements partitioned by the transverse joints, of the base plates and the segments being coupled together such that they have exclusively a translatory degree of freedom with respect to one another in the direction of the longitudinal axis of the aircraft.

8 Claims, 6 Drawing Sheets

Fig. 8    section C-C
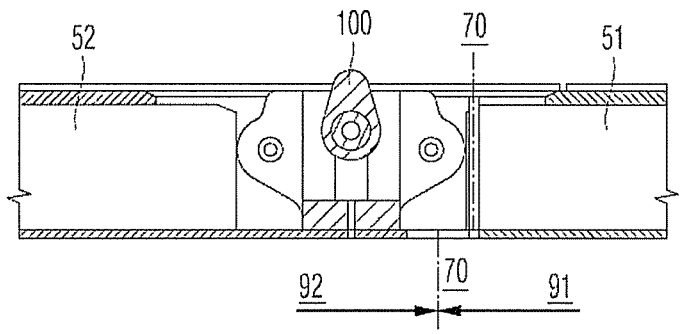
Fig. 9    section B-B
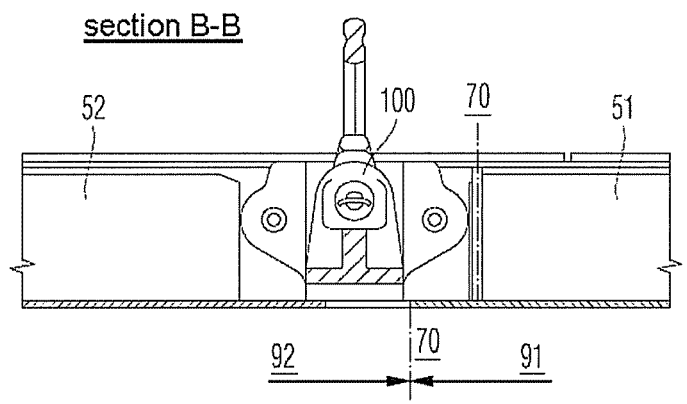
Fig. 10    section A-A
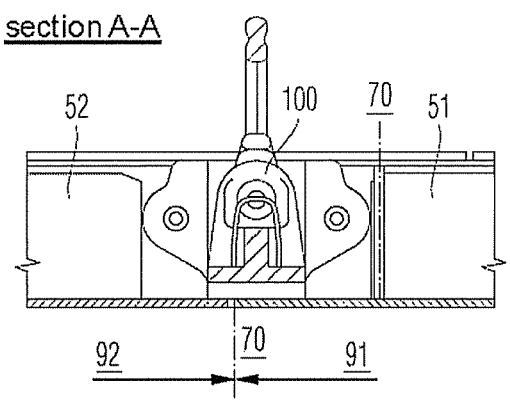

ATTACHMENT ARRANGEMENT FOR A CARGO COMPARTMENT FLOOR OF AN AIRCRAFT AND AIRCRAFT WITH AN ATTACHMENT ARRANGEMENT OF THIS TYPE

CROSS-REFERENCE TO RELATED APPLICATIONS

This application claims the benefit of U.S. Provisional Application No. 61/179,876, filed May 20, 2009, the entire disclosure of which is herein incorporated by reference.

FIELD OF THE INVENTION

The present invention relates to the floor of an aircraft consisting of a number of floor plates and a number of longitudinal supports and to an aircraft which has a floor of this type.

A conventional aircraft floor or cargo compartment floor of an aircraft is shown schematically in FIG. 1. The aircraft floor 10 according to FIG. 1 is formed from a large number of floor plates 20, 30, 40 and longitudinal supports 50, 60 or longitudinal profiles which are in a function-dependent mutual spacing and run parallel to the longitudinal axis (x) of the aircraft.

The longitudinal supports 50, 60 consist of longitudinal support elements 51, 52; 61, 62. The floor plates 20-40 consist analogously of floor plate elements 21-23; 31-33; 41-43. The longitudinal support elements 51, 52; 61, 62 are in an offset arrangement with respect to the floor plate elements 21-23; 31-33; 41-43.

Crossbeams (not shown) conventionally run below the longitudinal supports 51, 52; 61, 62 and in some types of aircraft, particularly in cargo aircraft, they simultaneously constitute the formers (so-called integral formers). The crossbeams preferably run in a mutual uniform spacing below the longitudinal profiles in each case transversely (y axis) to the longitudinal axis of the aircraft. The longitudinal profiles can have at least to some extent channels (so-called "tie-down channels") which are used for receiving tie-down points. The tie-down points secure rolling loads, for example, on the cargo compartment floor by means of tensioning ropes such that they cannot change position. The longitudinal profiles resting on the crossbeams form, together with further elements, a grid-shaped floor frame. Inserted between the longitudinal profiles are base plates or floor plates to achieve a substantially planar and walkable floor surface.

The crossbeams optimally transmit vertical and transversal loads which act parallel to the z axis, i.e. the vertical axis, or to the y axis, i.e. transversely to the direction of flight. Furthermore, the crossbeams can absorb torques about the x axis (so-called torque $M_x$). The forces arising parallel to the x axis (and to the y axis) (so-called forces $F_x$ (and $F_z$)) as well as the torque $M_x$ about the x axis require formers which can be loaded in a mechanically adequate manner. The conventional longitudinal supports or the channels are loaded in particular by the forces $F_x$ and by the torques $M_y$. In this case, loads are absorbed by the longitudinal axis in the direction of flight and are introduced into the outer skin of the aircraft via diagonals.

The tie-down devices are usually connected to the upper flanges of the formers by four screws in each case. For this reason, the mentioned mechanical loads are indirectly introduced in the form of the former, as a result of which additional statically relevant offset moments occur which have to be absorbed and entail increases in weight due to the relatively stable design of the formers, longitudinal supports and channels required thereby.

An occasional function of the above-mentioned base plates or floor plates is to transfer loads from the tie-down devices or seat rails via thrust into the lateral outer skin of the aircraft. This function restricts their floating and thus also their length. The base plates form a bond with the channels of the floor and thereby increase the flexural strength thereof. Furthermore, they thus also define the optimum load introduction point for the tie-down loads in the direction of the x axis. In cooperation with the channels or seat rails, the base plates stabilise the crossbeams or transverse profiles of the primary structure.

It should be particularly noted in this case that in the event of an accident or crash, the freight of the aircraft is accelerated by 9 g. It is the function of the floor to introduce this load uniformly at the sides into the outer skin of the aircraft.

Due to the closeness of the floor to the outer skin of the aircraft, it is necessary to uncouple the floor and the fuselage by a suitable floating of the connection elements. During a flight, the outer skin of the aircraft cools down to the external temperature of for example −55° C. In contrast, the interior of the aircraft is heated to for example 20° C. This high temperature difference causes a relative expansion of approximately 1 mm/m between the floor and the outer skin for the example of an aluminium aircraft structure. In an exemplary aircraft which is 17 m in length, this would correspondingly be an expansion of 17 mm.

Furthermore, military transport aircraft suffer from the additional problem that the rigidities of the floor must be significantly higher, driven by load. Accordingly, in this case a thermal expansion also results in significantly higher loads.

Bracing would have to be carried out via diagonal paddles which would have to be of a corresponding weight. The floor would be part of the primary structure and would have to be tested accordingly, in other words, flight loads would have to be applied superimposed with cargo loads.

Restraint of the floor by connecting paddles would entail problems because, due to the floating of the floor plates, clamping deformations would nevertheless develop in the middle of the floor, for which the formers are not designed. An improved design of the formers would, in turn, have disadvantages in terms of weight.

SUMMARY OF THE INVENTION

Accordingly, an object of the present invention is to provide an aircraft floor which is reduced in weight and does not suffer from the above-mentioned disadvantages.

This object is achieved according to the invention by an aircraft floor which has the features of claim 1 and by an aircraft which has the features of claim 10.

Hence, an aircraft floor of an aircraft is proposed which consists of a number of base plates and a number of longitudinal supports, transverse joints being provided for partitioning the aircraft floor into a plurality of segments transversely to a longitudinal axis of the aircraft, the respective segment consisting of a number of longitudinal support elements, partitioned by the transverse joints, of the longitudinal supports and of a number of base plate elements, partitioned by the transverse joints, of the base plates and the segments being coupled together such that they have exclusively a translatory degree of freedom with respect to one another in the direction of the longitudinal axis of the aircraft.

Furthermore, an aircraft is proposed which has at least one floor as described above.

An advantage of the present invention is that due to the arrangement according to the invention of the transverse joints or expansion joints, the aircraft floor is partitioned into segments which exclusively have a translatory degree of freedom with respect to one another in the direction of the longitudinal axis of the aircraft.

Consequently, the aircraft floor is thermally uncoupled. The segments can be coupled with one another such that a movement of the segments of the aircraft floor is enabled in the direction of the longitudinal axis of the aircraft and a movement of the segments of the aircraft floor in the direction of the transverse axis and in the direction of the vertical axis of the aircraft is prevented.

The base plates or floor plates preferably have the width of at least one former division in the flight direction or in the direction of the longitudinal axis of the aircraft. The longitudinal supports with the channels and/or seat rails are partitioned in the direction of flight like the base plates. In this case, the channel/seat rail segments can be integral components of the base plates in terms of structural mechanics. The x loads are preferably diverted into the outer skin via defined fixed bearings, so-called connecting paddles or crash paddles (see paddles 12 and outer skin 13 in FIG. 2). In this arrangement, a respective outer paddle is positioned on each side.

The base plates are preferably fixed merely in all three axes by a tie-down device (tie-down). The tie-down device allows a floating for the base plates in the direction of flight. The screw connection of the tie-down device of the middle former provides a screw connection which is structurally capable of bearing (fixed bearing). The lateral connection to the channels is performed according to the same principle. In this case, a coupling piece is preferably arranged on the former and engages when there are loads in the x direction and introduces the x loads into the respective floor plate or panels in a positive manner without moments.

Furthermore, y loads are introduced directly into the former by the tie-down devices due to the screw connection thereof. Thermal expansion in the y direction is preferably uncoupled by bending of the channel walls.

Thus, advantageously, no constraining forces arise overall. The structure of the aircraft floor therefore only has to be designed for the forces which actually have to be applied driven by load. This results in a weight-optimised floor, as complex screw connections of the base plates are unnecessary.

Advantageous embodiments and improvements of the invention are set out in the subclaims.

According to a preferred development, the segments can be displaced relative to one another in the longitudinal axis (x) and are disposed to transmit forces onto one another in the direction of a transverse axis (y) and in the direction of a vertical axis (z) of the aircraft.

According to a further preferred development, the respective segment has, on its first end, a coupling part and, on its second end, a corresponding coupling counterpart. The coupling part of a first segment can be coupled with the coupling counterpart of a second segment such that the segments exclusively have a translatory degree of freedom with respect to one another in the direction of the longitudinal axis (x) of the aircraft.

According to a further preferred development, the coupling part is configured as projecting teeth and the coupling counterpart is configured as a seat corresponding to the teeth. The transverse joint is formed between the teeth and the seat.

According to a further preferred development, a tie-down device is screwed to a transverse profile running transversely to the longitudinal axis (x) of the aircraft at least partly in the region of the coupling through the coupling part and the coupling counterpart such that the tie-down device attaches only one of the two segments to the transverse profile.

According to a further preferred development, the tie-down device attaches the seat of the coupling counterpart to the transverse profile so that the teeth of the coupling part have the degree of freedom in the direction of the longitudinal axis (x) of the aircraft.

According to a preferred development, the at least one transverse profile is configured as a crossbeam and/or as a former of a fuselage airframe of the aircraft.

According to a further preferred development, lateral connecting paddles (see paddles 12 and outer skin 13 in FIG. 2) are provided which produce a continuous connection of the aircraft floor to an outer skin of the aircraft.

According to a further preferred development, the respective segment has at least one longitudinal support element and at least one base plate element connected to the respective longitudinal support element.

In the following, the invention will be described in detail on the basis of embodiments with reference to the accompanying figures.

BRIEF DESCRIPTION OF THE DRAWINGS

FIG. 8 is a sectional view along line C-C in FIG. 6; and

FIG. 9 is a sectional view along line B-B in FIG. 6; and

FIG. 10 is a sectional view along line A-A in FIG. 6.

DESCRIPTION OF EXEMPLARY EMBODIMENTS

Figure 1:
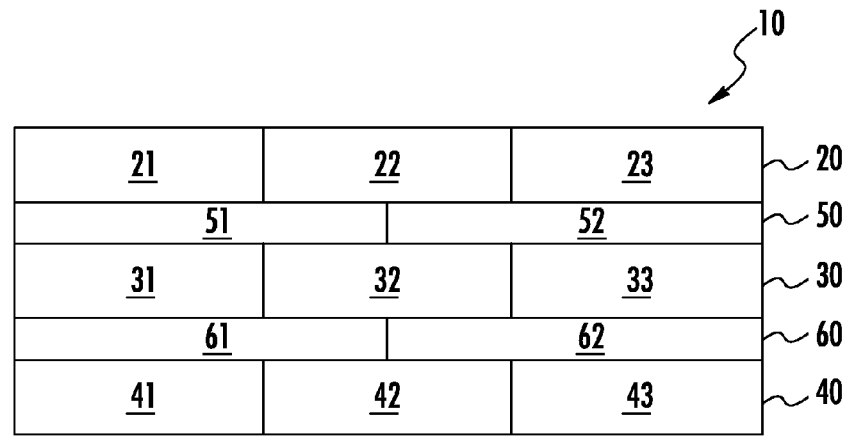
FIG. 1 is a schematic view of a conventional aircraft floor.

In the figures, the same reference numerals denote like or functionally identical components, unless indicated otherwise.

Furthermore, in the figures, x denotes the longitudinal axis of the aircraft. The transverse axis of the aircraft is denoted by y and the vertical axis of the aircraft is denoted by z.

Figure 3:
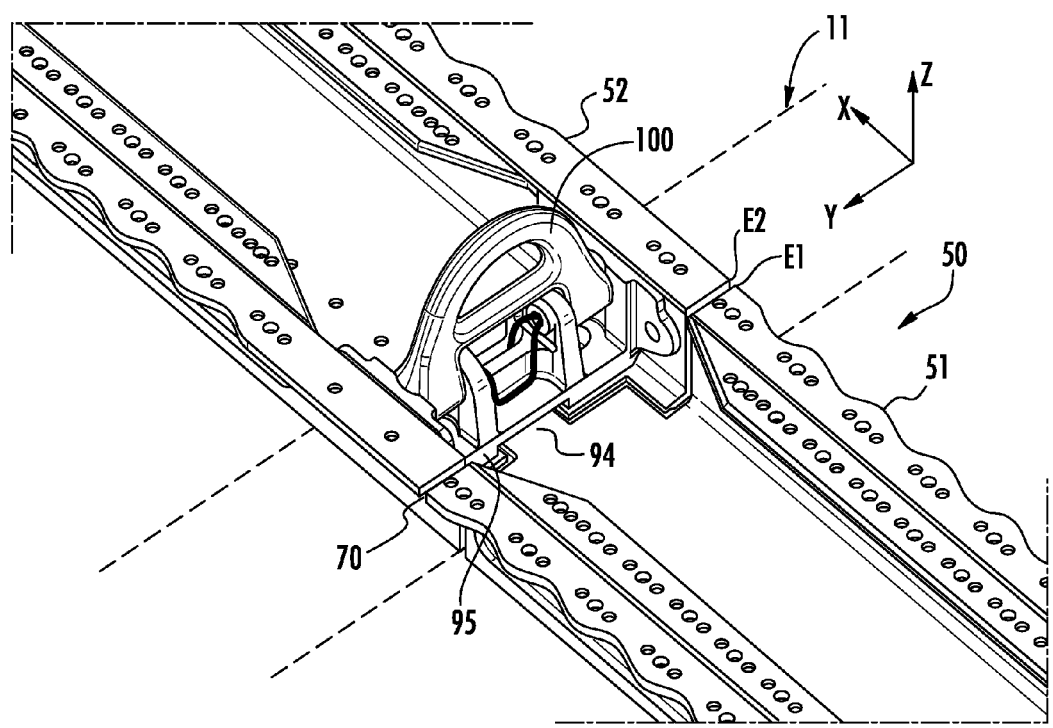
FIG. 3 is a perspective view of a longitudinal support of a second embodiment of the aircraft floor according to the invention.
Figure 4:
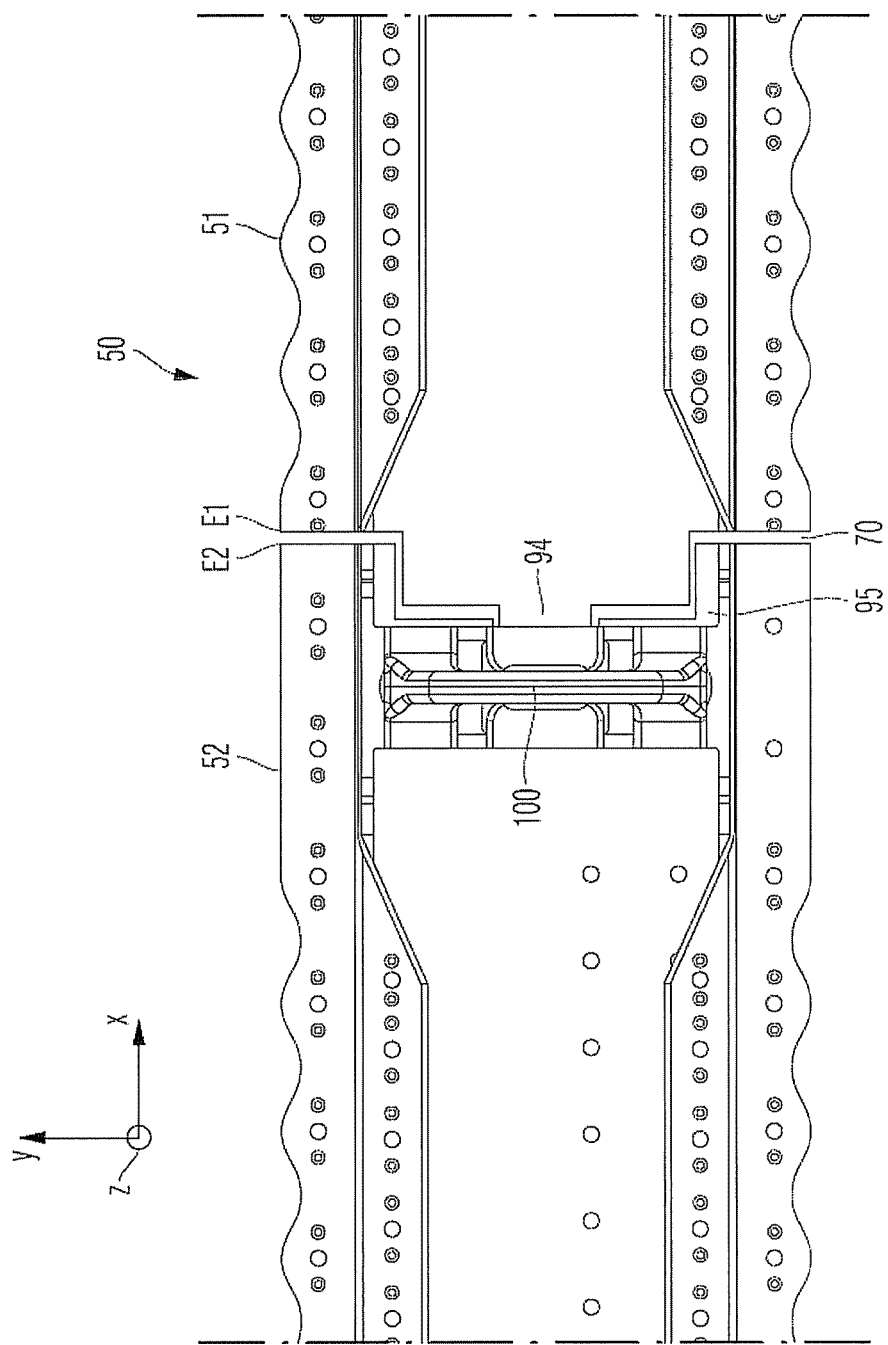
FIG. 4 is a plan view of the longitudinal support according to FIG. 3.
Figure 5:
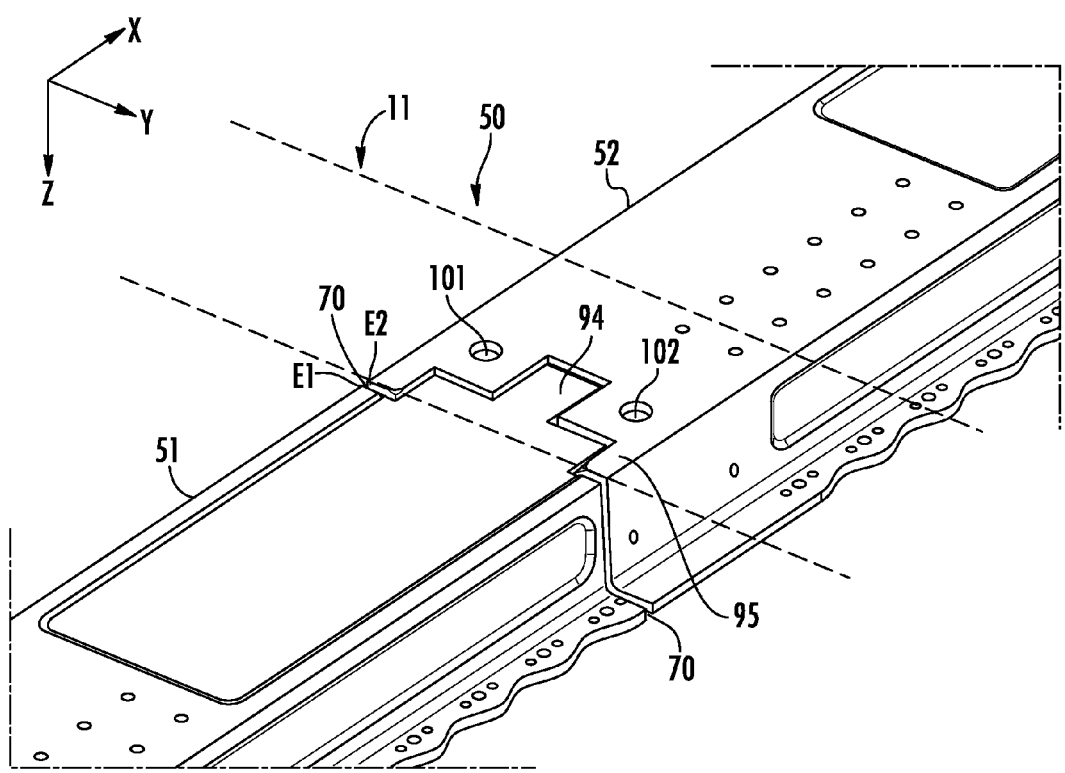
FIG. 5 is a perspective view of the longitudinal support according to FIG. 3 rotated by 180° with respect to FIG. 3.
Figure 6:
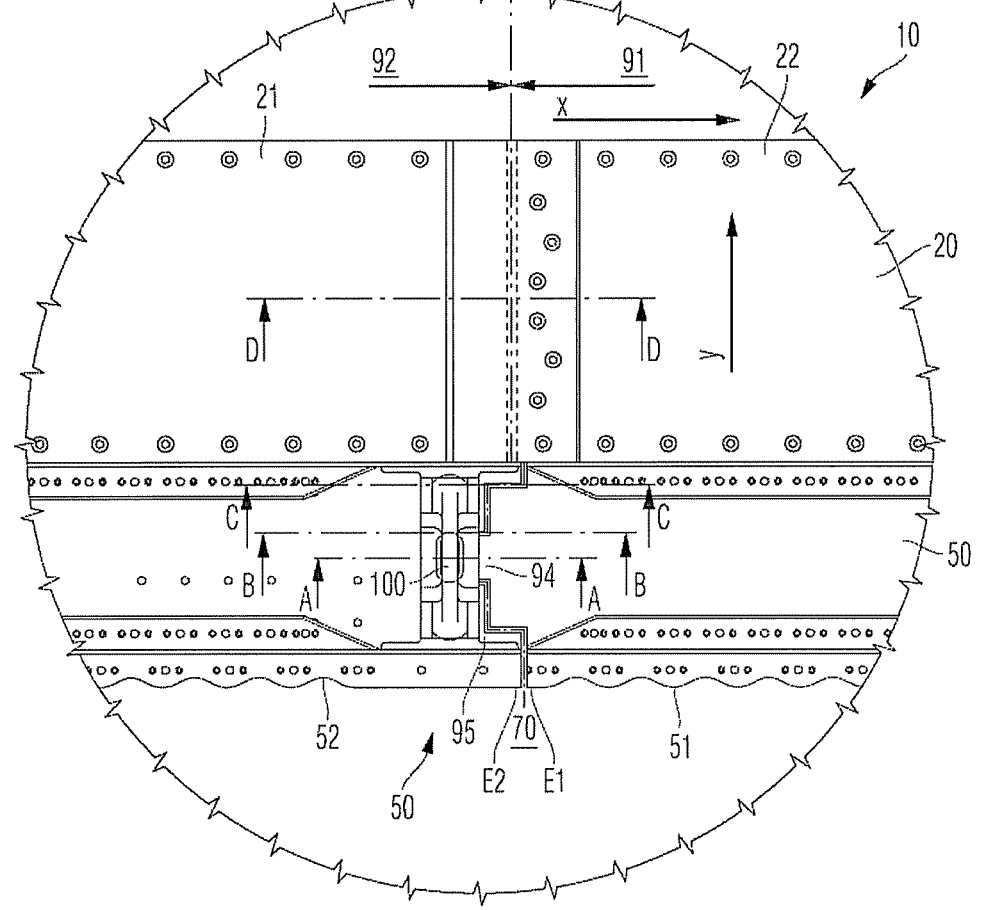
FIG. 6 is a schematic sectional view of the second embodiment of the aircraft floor according to the invention.

In the following, two embodiments of the aircraft floor 10 according to the invention are described in detail. In this case, the first embodiment of the aircraft floor 10 according to the invention is described with reference to FIG. 2. The second embodiment of the aircraft floor 10 according to the invention is shown in FIG. 6. FIGS. 3 to 5 show detail views of the longitudinal support 50 of the aircraft floor 10 according to FIG. 6.

Figure 2:
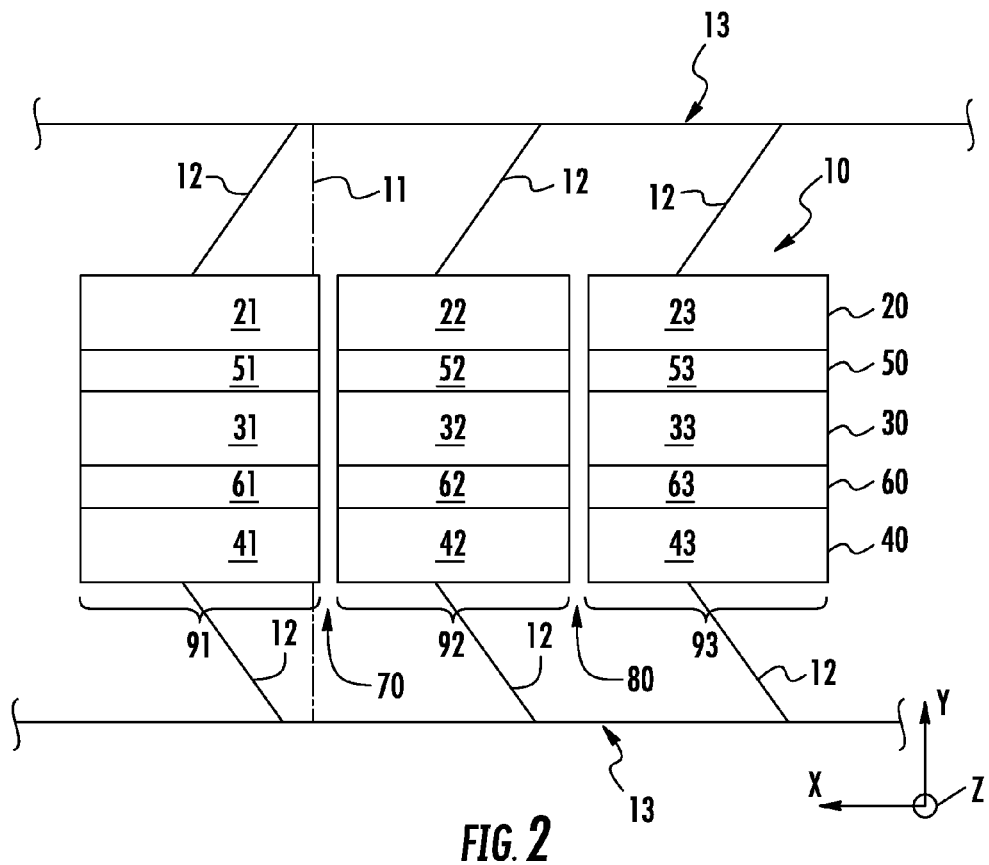
FIG. 2 is a schematic view of a first embodiment of an aircraft floor according to the invention.

The two embodiments of the aircraft floor 10 of the invention according to FIGS. 2 and 6 have the following features in common:

The aircraft floor 10 has a number of base plates 20, 30, 40 and a number of longitudinal supports 50, 60. To improve clarity, FIG. 2 shows a purely schematic illustration of the aircraft floor 10, whereas FIG. 6 shows a particularised detail of the aircraft floor 10.

Furthermore, the aircraft floor 10 has transverse joints 70, 80 for partitioning the floor 10 into a plurality of segments 91-93 transversely to a longitudinal axis x of the aircraft. The transverse joints 70, 80 perform the function of a separating line and the function of an expansion joint. The expansion joint 70, 80 is capable of thermally decoupling the segments 91-93 of the floor 10. In this case, the expansion joint 70, 80 is disposed to be able to absorb a predetermined expansion, for example of a few millimetres.

The respective segment 91-93 consists of a number of longitudinal support elements 51-53; 61-63 partitioned by the transverse joints 70, 80, of the longitudinal supports 50, 60 and of a number of base plate elements 21-23; 31-33; 41-43, partitioned by the transverse joints 70, 80, of the base plates 20, 30, 40.

In accordance with the first embodiment according to FIG. 2, a first segment 91 of the floor 10 has the base plate elements 21, 31, 41 and the longitudinal support elements 51, 61. Analogously, a second segment 92 of the floor 10 has the base plate elements 22, 32, 42 and the longitudinal support elements 52, 62. Also analogously, a third segment 93 of the floor 10 has the base plate elements 23, 33, 43 and the longitudinal support elements 53, 63. Without loss of generality, shown in FIG. 2 are three segments 91-93 with three base plates 21-23; 31-33; 41-43 and two longitudinal support elements 51-53; 61-63.

The segments 91-93 are coupled together such that they exclusively have a translatory degree of freedom with respect to one another in the direction of the longitudinal axis x of the aircraft.

In this case, the segments 91-93 can be moved relative to one another in the longitudinal axis x and are disposed to transmit forces onto one another in the direction of the transverse axis y and in the direction of the vertical axis z of the aircraft. Lateral connecting paddles 12 are provided which produce a continuous connection of the aircraft floor to an outer skin 13 of the aircraft.

To improve clarity, FIG. 6 shows a detail of the second embodiment of the aircraft floor 10 with a longitudinal support 50 and a base plate 20. The longitudinal support 50 is described in detail with reference to FIGS. 3 to 5 and the base plate 20 is described in detail with reference to FIG. 7.

The longitudinal support 50 according to FIGS. 3 to 5 is partitioned by the transverse joint 70. In this case, FIG. 3 is a perspective view of the longitudinal support 50 of the second embodiment of the aircraft floor 10 according to the invention. FIG. 4 is a plan view of the longitudinal support 50 according to FIG. 3 and FIG. 6 is a perspective view of the longitudinal support 50 according to FIG. 5 rotated by 180° with respect to FIG. 3.

The longitudinal support 50 is partitioned by the transverse joint 70, as already described above, and thus has the longitudinal support elements 51 and 52 separated by the transverse joint 70. The respective longitudinal support element 51, 52 has a coupling part 94 on its first end E1 and a corresponding coupling counterpart 95 on its second end E2. The coupling part 94 of the first longitudinal support element 51 can be coupled with the coupling counterpart 95 of the second longitudinal support element 52 such that the longitudinal support elements 51, 52 exclusively have a translatory degree of freedom with respect to one another in the direction of the longitudinal axis x of the aircraft.

Furthermore, a tie-down device 100 is provided to form a tie-down point. The tie-down device 100 is screwed to a transverse profile 11 (see dashed line in FIGS. 3 and 5) running transversely to the longitudinal axis x of the aircraft at least partly in the region of the coupling through the coupling part 94 and the coupling counterpart 95 such that the tie-down device 100 attaches only one of the two longitudinal support elements 51, 52 to the transverse profile. According to the embodiment of FIGS. 3 to 5, the tie-down device 100 only attaches the second longitudinal support element 52 to the transverse support or transverse profile.

The reference numerals 101, 102 in FIG. 5 show holes for the screw connection of the tie-down device 100.

Furthermore with reference to FIGS. 3 to 5, the coupling part 94 is preferably configured as projecting teeth. Correspondingly, the coupling counterpart 95 is configured as a seat 95 corresponding to the teeth 94. The transverse joint 70 is formed between the teeth 94 and the seat 95.

Figure 7:
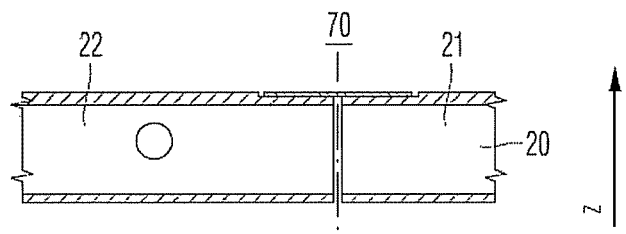
FIG. 7 is a sectional view along line D-D in FIG. 6.

The configuration of the teeth 94, the seat 95 and the transverse joint 70 becomes clear particularly with reference to FIGS. 7 to 10. FIG. 7 is a sectional view along line D-D in FIG. 6. Without loss of generality, the base plate 20 according to FIG. 7 has two base plate elements 21, 22 which are separated by the transverse joint 70. By looking at both FIG. 6 and FIG. 7, it can be seen that a first segment 91 has a first longitudinal support element 51 and a first base plate element 21. In contrast thereto, a second segment 92 has a second longitudinal support element 52 and a second base plate element 22. The two segments 91, 92 are separated by the transverse joint 70 or separating line for thermal decoupling.

The configuration of the teeth 94 and of the corresponding seat 95 becomes particularly clear from the sectional views of FIGS. 8 to 10. FIG. 8 is a sectional view along line C-C in FIG. 6, FIG. 9 is a sectional view along line B-B of FIG. 6 and FIG. 10 is a sectional view along line A-A of FIG. 6.

Although the present invention has been currently described with reference to preferred embodiments, it is not restricted thereto, but can be modified in many different ways.

LIST OF REFERENCE NUMERALS 10 aircraft floor
11 transverse profile
12 paddle
13 outer skin
20, 30, 40 base plate
21-23 base plate element
31-33 base plate element
41-43 base plate element
50, 60 longitudinal support
51-53 longitudinal support element
61-63 longitudinal support element
70, 80 transverse joint
91-93 segment
94 coupling part
95 coupling counterpart
100 tie-down device
101, 102 hole
E1 first end
E2 second end
x longitudinal axis
y transverse axis
z vertical axis

The invention claimed is:

1. An aircraft floor of an aircraft consisting of a number of base plates and a number of longitudinal supports, transverse joints being provided for partitioning the aircraft floor into a plurality of segments transversely to a longitudinal axis of the aircraft, the respective segment consisting of a number of longitudinal support elements, partitioned by the transverse joints, of the longitudinal supports and of a number of base plate elements, partitioned by the transverse joints, of the base plates and the segments being coupled together such that they have exclusively a translatory degree of freedom with respect to one another in the direction of the longitudinal axis of the aircraft, wherein the respective longitudinal support element has a coupling part on its first end and a corresponding coupling counterpart on its second end, wherein the coupling part of a first longitudinal support element is coupled with the coupling counterpart of a second longitudinal support element such that the longitudinal support elements exclusively have a translatory degree of freedom with respect to one another in the direction of the longitudinal axis of the aircraft, wherein the coupling part is configured as projecting teeth and the coupling counterpart is configured as a seat corresponding to the teeth, the transverse joint being formed between the teeth and the seat, wherein a tie-down device is attached to a transverse profile running transversely to the longitudinal axis of the aircraft at least partly in the region of the coupling through the coupling part and the coupling counterpart such that the tie-down device attaches only one of the two segments to the transverse profile, wherein the tie-down device attaches the seat of the coupling counterpart to the transverse profile such that the teeth of the coupling part have the degree of freedom in the direction of the longitudinal axis of the aircraft.

2. The aircraft floor according to claim 1, wherein the segments can be displaced relative to one another in the longitudinal axis and are disposed to transmit forces onto one another in the direction of a transverse axis and in the direction of a vertical axis of the aircraft.

3. The aircraft floor according to claim 1, wherein the transverse profile is configured as a crossbeam and/or as a former of the aircraft.

4. The aircraft floor according to claim 1, wherein lateral connecting paddles are provided which produce a continuous connection of the aircraft floor to an outer skin of the aircraft.

5. The aircraft floor according to claim 1, wherein the respective segment consists of at least one longitudinal support element and at least one base plate element connected to the respective longitudinal support element.

6. An aircraft which has an aircraft floor according to claim 1.

7. The aircraft floor according to claim 1, wherein the respective segment has on its first end the coupling part and on its second end the corresponding coupling counterpart, it being possible for the coupling part of the first segment to be coupled with the coupling counterpart of the second segment such that the segments have exclusively a translatory degree of freedom with respect to one another in the direction of the longitudinal axis of the aircraft.

8. The aircraft floor according claim 7, wherein the tie-down device is screwed to the transverse profile running transversely to the longitudinal axis of the aircraft at least partly in the region of the coupling through the coupling part and the coupling counterpart such that the tie-down device attaches only one of the two segments to the transverse profile.

* * * * *